United States Patent [19]

Hayashida

[11] 4,284,308
[45] Aug. 18, 1981

[54] BRAKE PRESSURE CONTROL VALVE

[75] Inventor: Yoshihiro Hayashida, Chigasaki, Japan

[73] Assignee: Tokico Ltd., Kanagawa, Japan

[21] Appl. No.: 47,802

[22] Filed: Jun. 11, 1979

Related U.S. Application Data

[63] Continuation of Ser. No. 865,326, Dec. 28, 1977, abandoned.

[30] Foreign Application Priority Data

Jan. 12, 1977 [JP] Japan .................................. 52/2010

[51] Int. Cl.³ ............................................. B60T 8/26
[52] U.S. Cl. ................................... 303/6 C; 188/349; 303/84 A
[58] Field of Search ..................... 303/6 C, 6 R, 84 R, 303/84 A; 188/349; 251/81

[56] References Cited

U.S. PATENT DOCUMENTS

| 3,727,991 | 4/1973 | DeHoff et al. | 303/6 C |
| 3,872,885 | 3/1975 | Eloi et al. | 303/6 C X |
| 3,969,000 | 7/1976 | Ohta et al. | 303/6 C |
| 3,970,347 | 7/1976 | Mizusawa | 303/6 C |
| 3,975,060 | 8/1976 | Hirayama | 303/6 C |
| 4,070,644 | 1/1978 | Shellhause | 303/6 C X |

Primary Examiner—Douglas C. Butler
Attorney, Agent, or Firm—Wenderoth, Lind & Ponack

[57] ABSTRACT

A brake pressure control valve controls the hydraulic pressure supplied to rear wheel brakes in two independent circuits of a dual hydraulic braking system of a vehicle. The valve includes two valve bodies slidably received in a bore of a housing and movable toward one another upon receiving hydraulic pressure, valve seats formed respectively in the valve bodies, a free piston assembly the opposite ends of which are mounted slidably and sealingly on the valve bodies, and valve members mounted on opposite ends of the free piston assembly and defining valve heads cooperating with the valve seats in the valve bodies.

4 Claims, 6 Drawing Figures

BRAKE PRESSURE CONTROL VALVE

This is a continuation of application Ser. No. 865,326, filed Dec. 28, 1977, now abandoned.

BACKGROUND OF THE INVENTION

This invention relates to brake pressure control valves for use in dual-circuit brake systems in vehicles such as automobiles.

Brake pressure control valves adapted for use in a dual-circuit brake system of X-type connection wherein the righthand front wheel brake and the left-hand rear wheel brake constitute one of the circuits and the left-hand front wheel brake and the right-hand rear wheel brake constitute the other circuit are, as shown in U.S. Pat. No. 3,969,000 or the like, known to the public. The brake pressure control valves shown in the above patent have the characterizing feature that two valve bodies separately receiving hydraulic pressure in respective circuits are controlled by a single spring such that when the hydraulic pressures in the respective circuits are normal the valve bodies move toward one another by compressing the spring to control the rear wheel brakes at a predetermined pressure. However, when one of the hydraulic pressure circuit fails the valve body in the failed circuit does not move so that the spring is not correspondingly compressed thus reducing the spring force acting on the valve body in the other circuit and reducing the hydraulic pressure in the rear wheel brake of the other circuit.

Further, there is a necessity to increase the hydraulic pressure in the rear wheel brake for maintaining the overall braking effect when failure occurs in one of the circuits, since the available hydraulic circuits are reduced to half.

BRIEF SUMMARY OF THE INVENTION

An object of the present invention is to solve the problems aforementioned by providing a brake pressure control valve comprising a housing, two fluid passages formed respectively in the housing with one end of each passage being connected to a source of hydraulic pressure and the other end of each passage being connected to a brake cylinder, two valve bodies slidably disposed in the housing. First ends of the bodies oppose one another, and the other ends of the bodies are exposed to a respective one of the fluid passages. A spring is disposed between the first ends of the valve bodies to urge them away from one another. A free piston assembly has opposite ends slidably received in the respective valve bodies and exposed to the hydraulic pressure in the respective passages. Two valve members are disposed on the opposite ends of the free piston assembly and are displaceable relative to the free piston assembly for cooperating respectively with the valve bodies to open or close the respective passages. Valve springs urge the respective valve members away from the free piston assembly, and stop means restrict the movement of the valve members away from the opposite ends of the free piston assembly.

BRIEF DESCRIPTION OF THE DRAWINGS

Further objects and advantages of the present invention will be given in conjunction with the attached drawings showing some embodiments of the present invention, in which.

DETAILED DESCRIPTION OF THE EMBODIMENTS

Figure 1:
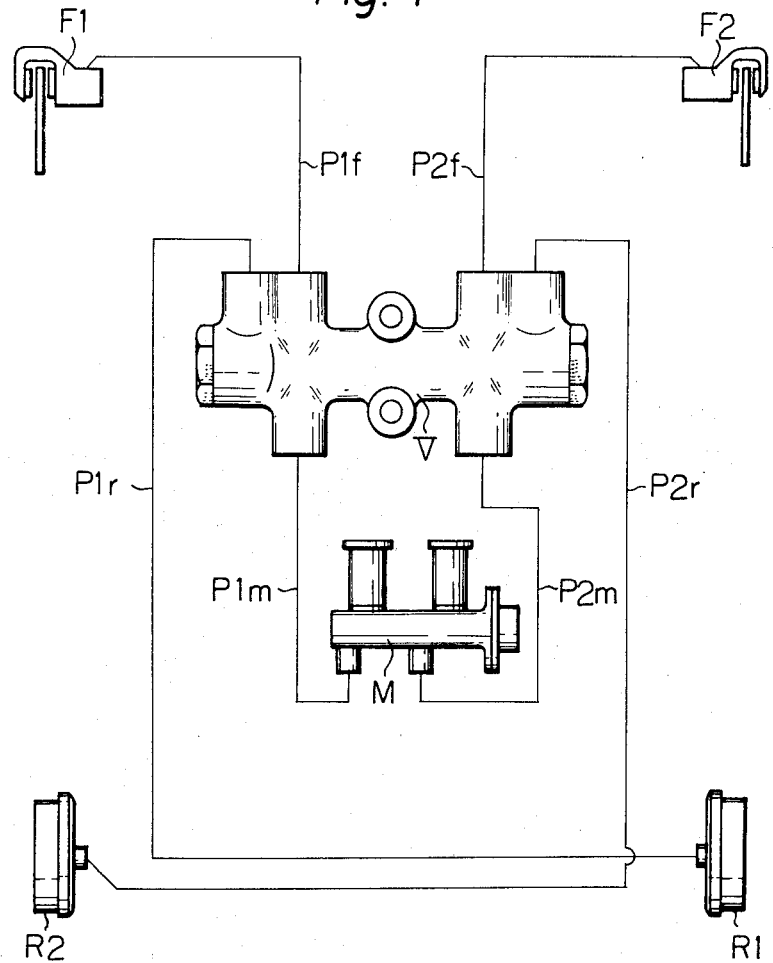
FIG. 1 is a schematic view showing one example of a dual-circuit hydraulic brake system comprising a brake pressure control valve according to the present invention.

The dual-circuit hydraulic brake system shown in FIG. 1 comprises a master cylinder M acting as the source of hydraulic pressure, a brake pressure control valve V according to the present invention being connected through lines P1m and P2m with the master cylinder M, the left-side and right-side front wheel brakes F1 and F2 connected respectively to the valve V through lines P1f and P2f, and the left-side and right-side rear wheel brakes R2 and R1 connected respectively with the valve V through lines P2r and P1r. The lines P1m, P1f and P1r constitute the first circuit and the lines P2m, P2f and P2r constitute the second circuit.

Figure 2:
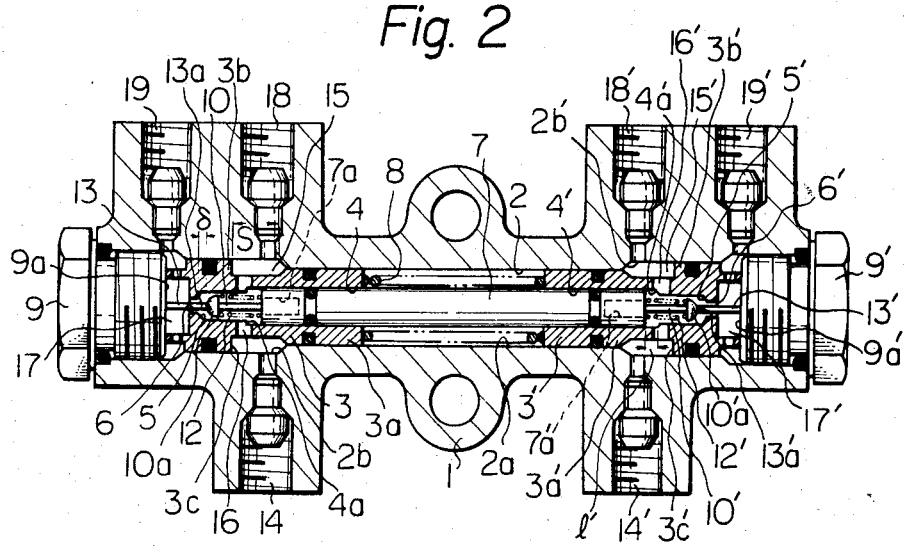
FIG. 2 is a longitudinal cross-sectional view of the brake pressure control valve of FIG. 1.

The brake pressure control valve V comprises, as shown in FIG. 2, a housing or main body 1 having a longitudinal bore 2 extending therethrough with a small diameter portion 2a on the central portion and large diameter portions 2b and 2b' on the opposite end portions.

Valve bodies 3 and 3' are slidably received in the bore 2 with small diameter portions 3a and 3a' being sealingly fitted in the bore 2a, and large diameter portions 3b and 3b' being sealingly fitted in the large diameter portions 2b and 2b' respectively. The valve bodies 3 and 3' have respectively large diameter bores 4 and 4' opening on the end surfaces of the small diameter portions 3a and 3a', and small diameter bores 6 and 6' which open on the end surfaces of the large diameter portions 3b and 3b' respectively, and which communicate with large diameter bores 4 and 4' through valve seat portions 5 and 5' defined therebetween. Opposite end portions of a free piston 7 are slidably and sealingly received in respective large diameter bores 4 and 4' of the valve bodies 3 and 3'. Stepped portions 4a and 4a' are formed respectively in the bores 4 and 4' to act as stops restricting the movement of the free piston 7 relative to the bores 4 and 4'. The stepped portions 4a and 4a' may be replaced by C-rings, sleeves or the like secured in the bores 4 and 4'. A coil spring 8 is disposed in the bore 2a to act on the valve bodies 3 and 3' to urge them away from each other so that, in the normal inactuated condition shown in the drawing, the valve bodies 3 and 3' contact against the inner ends 9a and 9a' of end caps 9 and 9' closing the opposite ends of the bore 2.

Figure 3:
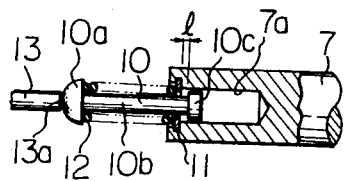
FIG. 3 is an enlarged view showing a portion of FIG. 2.
Figure 4:
FIG. 4 is a front view of a stop shown in FIG. 3.

Valve members 10 and 10' are mounted respectively on the opposite ends of the free piston 7. As shown in FIG. 3, a bore 7a is formed in the free piston 7 to slidably receive a large diameter portion 10c formed on one end of a stem 10b of the valve member 10. A valve head 10a cooperating the valve seat 5 shown in FIG. 2 is formed on the other end of the stem 10b. A generally C-shaped stop 11 is secured on the open end of the bore 7a and movably receives the stem 10b of the valve member 10 and prevents the outward movement of the large diameter portion 10c from the bore 7a. A valve spring 12 acts between the stop 11 and the valve head 10a to urge the valve member 10 in the direction projecting outward from the bore 7a. The valve member 10' is similarly mounted on the other end of the free piston 7.

Valve rods 13 and 13' are secured to end caps 9 and 9' respectively, and extend through the small diameter bores 6 and 6' of the valve bodies 3 and 3' with sufficient clearance being left therebetween. In the normal inactuated condition shown in the drawing the valve rods 13 and 13' engage respectively with valve heads 10a and 10'a of the valve members 10 and 10' whereby a predetermined clearance δ is formed between each of the valve heads 10a and 10a' of the valve members 10 and 10' and each of corresponding valve seat portions 5 and 5' and accommodates any dimensional tolerance between the dimension of the valve rods 13 and 13' of end caps 9 and 9' and the dimension of the valve heads 10a and 10'a of the valve members 10 and 10' mounted on the free piston 7. As shown in FIG. 3 a small clearance l" is maintained between the large diameter portion 10c of the valve member 10 and the stop 11 in the normal inactuated condition.

Shown at 14 and 14' are inlet ports formed in the main body 1 and connected to the master cylinder M through lines P1m and P2m respectively, and which open to annular spaces 15 and 15' defined by the large diameter bores 2b and 2b' of the main body 1, the outer periphery of small diameter portions 3a and 3a' of the valve bodies 3 and 3' and annular shoulders 3c and 3c' defined between the small diameter portions 3a and 3a' and the large diameter portions 3b and 3b' of the valve bodies. The annular spaces 15 and 15' communicate through openings 16 and 16' formed respectively in the valve bodies 3 and 3' with the interior of the bores 4 and 4', and also directly communicate with outlet ports 18 and 18' directly. The interior of the bores 4 and 4' communicate, in the inactuated condition shown in the drawing, through the small diameter bores 6 and 6' and spaces 17 and 17' defined respectively between the valve bodies 3 and 3' and end caps 9 and 9' with outlet ports 19 and 19' respectively.

The outlet port 18 is connected with the left-side front wheel brake F1 through line P1f and the outlet port 18' with the right-side front wheel brake F2 through line P2f, and the outlet port 19 is connected with the right-side rear wheel brake R1 through line P1r and the outlet port 19' with the left-side rear wheel brake R2 through line P2r.

The inlet port 14, the space 15, the opening 16, bores 4 and 6, the space 17 and the outlet port 19 constitute a first fluid passage according to the present invention, and the inlet port 14', the space 15', the opening 16', the bore 4', the bore 6', the space 17' and the outlet port 19' constitute the second fluid passage according to the present invention.

The brake pressure control valve according to the present invention having the construction as described heretofore operates as follows.

Assuming that the driver of the vehicle actuates the master cylinder M to stop the vehicle, pressurized liquid from a first pressure space (not shown) in the master cylinder M flowing through line P1m is introduced into inlet port 14 of the control valve V and flows, on the one hand, through the space 15, opening 16, bores 4 and 6, the space 17 and the outlet port 19 (the left-side fluid passage) to the right-side rear wheel brake R1 and, on the other hand, flows through the annular space 15 and the outlet port 18 to the left-side front wheel brake F1. In the second circuit, pressurized liquid from a second pressure space (not shown) in the master cylinder M is introduced into the inlet port 14' through line P2M and flows, on the one hand, though the right-side fluid passage to the left-side rear wheel brake R2 and, on the other hand, is supplied to the right-side front wheel brake F2 through the annular space 15', the outlet port 18' and line P2f.

When pressure from the master cylinder M elevates to a predetermined level or the force obtained by (hydraulic pressure)×(the effective area of valve members 3 and 3) increases to correspond to the compressive force of the spring 8, the valve bodies 3 and 3' move toward one another by compressing the spring 8 against the force thereof. When each of the valve bodies 3 and 3' displaces by the predetermined distance δ the valve members 10 and 10' engage with respective valve seat portion 5 and 5' to close the fluid passages. Thereafter, when the pressure from the master cylinder M increases further, the force corresponding to the difference in area between the large diameter portions 3b and 3b' and the small diameter portions 3a and 3a' of the valve bodies 3 and 3' displaces each of the valve bodies 3 and 3' away from one another, with the valve members 10 and 10' being retained by the adjacent ends of valve rods 13a and 13'a, thus separating the valve members 10 and 10' from the valve seat portions 5 and 5' and supplies further pressurized liquid to the outlet ports 19 and 19' and elevating the hydraulic pressure supplied to rear wheel brake. Thus, the pressure supplied to the rear wheel brakes in the initial stage of brake application is equal to pressure supplied to the front wheel brakes, but thereafter the pressure supplied to the rear wheel brakes increases at a reduced rate with respect to pressure rise in front wheel brakes.

The spring 8 acts equally on the valve bodies 3 and 3', thus the initial actuating pressures of the valve bodies 3 and 3' are equal with one another. Further, the distance δ between the valve seat portion 5 and 5' and the valve members 10 and 10' are equal with one another, thus the valve bodies 3 and 3' displace simultaneously to close the fluid passages, and pressures in both circuits are maintained equal.

The free piston 7 is located at the neutral position by valve springs 12 and 12' at that condition. A small differential pressure (0.5–1.0 kg/cm$^2$, for example) may sometimes occur between the two pressure spaces in a tandem type master cylinder and act on the free piston 7 to move it toward one end thereof, the clearance l defined between the large diameter portion 10c or 10'c of the valve member and the stop 11 or 11' in the other end of the free piston 7 will be taken up, and the valve spring 12 or 12' at the corresponding end will no longer act on the free piston 7. Thus, by determining that the spring force of the springs 12 and 12' larger than the force caused by such small pressure difference, it is possible to prevent undesirable displacement of the free piston 7 which tends to separate the valve heads 10a and 10'a of the valve members 10 and 10' from the tip ends 13a and 13'a of the valve rods 13 and 13' thus changing the predetermined distance δ. It is important to maintain the distance δ for ensuring equal pressure in the two circuits.

Alternatively, the clearance l may be determined to allow a considerable amount of movement of the free piston 7 with the spring force of the valve springs 12 and 12' being relatively small, whereby the free piston moves to compensate for a pressure difference between the two circuits.

Description will now be given with reference to the case when failure occurs in one of the circuits. Assume that the failure occurs in the second circuit shown on the right-side in FIG. 2. Since hydraulic pressure does not act on the valve body 3' and on the right-side end of the free piston 7, and hydraulic pressure acting on the left-side end of the free piston 7 is usually large enough to overcome the spring force of the valve spring 12', the free piston 7 moves right-ward and abuts with the stop 4a'. Therefore, the distance δ formed between the valve seat portion 5 of the valve body 3 and the valve head 10a of the valve 10 in the inactuated condition will be considered to increase by l'−l, wherein l' is the distance of the right-ward movement of the free piston 7 and l is the clearance between the large diameter portion 10c of the valve 10 and the stop 11. Since l'>l the stroke of the valve body 3 for closing the first fluid passage is larger than that of the normal operating condition, and the amount of compression of the spring 8 is increased, thus, hydraulic pressure in the right-side rear wheel brake R1 will increase correspondingly.

Figure 5:
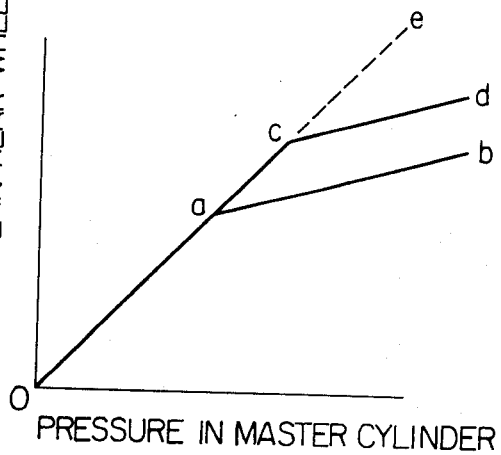
FIG. 5 is a characteristic diagram of the brake pressure control valve of FIG. 2.

In FIG. 5 showing a characteristic diagram, the valve seat portion 5 of the valve body 3 engages, in the normal operating condition (both circuits being alive), with the valve head 10a when hydraulic pressure in the master cylinder M increases to the point "a" and thereafter the pressure supplied to the rear wheel brake increases at a reduced rate as depicted by line "ab", while the pressure supplied to the front wheel brake increases along line "ae". When failure occurs in one of the circuits, the spring force of the spring 8 acting on the valve body is increased by the right-ward movement of the free piston 7, the valve head 10a engages with the valve seat portion 5 of the valve body 3 when hydraulic pressure in the master cylinder M reached to point "c" and thereafter pressure in the rear wheel brake increases along line "cd".

It will be noted that the aforesaid relation is obtained when the distance L defined by δ+l'−l is smaller than the effective stroke S of the valve body 3. If it is desired not to restrict the rear wheel brake pressure when failure occurs in one circuit or to obtain the characteristic curve "oce" for the rear wheel brake pressure, the relation between L and S is determined as L>S whereby the valve seat portion 5a of the valve body 3 does not engage with the valve head 10a when the free piston 7 has been moved rightward.

Figure 6:
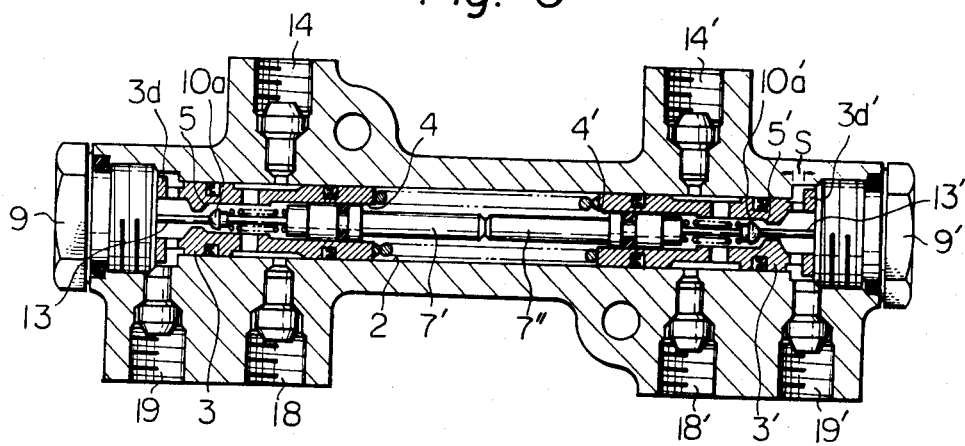
FIG. 6 is a longitudinal cross sectional view showing a modified form of a brake pressure control valve according to the present invention.

FIG. 6 shows another embodiment of the present invention which is modified slightly from the embodiment of FIG. 2. In FIG. 6, the free piston is divided into two pistons 7' and 7" supported respectively and separately in valve bodies 3 and 3' and abutting with one another at the inner ends thereof. Therefore, an aligning operation can easily be performed. Further, the stepped configuration of the bore 2 and the valve bodies 3 and 3' is changed to have a single bore which enables the machining costs to be substantially reduced. In this embodiment the stroke S of each of the valve bodies 3 and 3' is made relatively small by disposing stops 3d and 3d" as shown in the drawing, and thus the rear wheel brake pressure changes along line "oae" when failure occurs in one circuit.

The brake pressure control valve according to the present invention controls the brake pressure supplied to rear wheel brakes R1 and R2 as described heretofore, but it will be noted that many changes or modifications may be applied to the specified embodiments. For example, pipe lines to the front wheel brakes F1 and F2 may be connected directly to lines P1m and P2m, respectively. Further, the present invention may be applied to any type of dual-circuit brake system having two separate circuits for the rear wheel brakes. Further, in the illustrated embodiments a single spring 8 acts on the valve bodies 3 and 3', but it is possible to form a small diameter portion at the central portion of the bore 2 with two springs being disposed respectively between the small diameter portion and the valve bodies 3 and 3' for urging the valve bodies away from one another. In such case, it is possible to arrange an electric switch at the small diameter portion for detecting the movement of the free piston, thereby detecting electrically the failure of one of the circuits.

The C-shaped stops 11 and 11' restrict the movement of valve members 10 and 10' away from the free piston 7 in the illustrated embodiment. But ring shaped stops may be utilized with the large diameter portions 10c and 10'c being formed by rings fitted in grooves formed in the stem portions 10b and 10b' of the valve members 10, 10'. Alternatively, the stops may be formed by caulking the open end portions of the bores 7a and 7a' of the free piston 7.

As described heretofore in detail, the brake pressure control valve according to the present invention has the following advantages.

(1) Since the distance between valve seat portions and the valve heads are maintained equal, in the normal operating condition, two circuits are maintained at equal pressures.

(2) When failure occurs in one of the circuits it is possible to increase the pressure supplied to the rear wheel brake in the other circuit, thus minimizing the loss of the braking effect.

(3) Since the valve mechanisms of two circuits are identical, the design and manufacture are simplified and, therefore, a reliable, compact and inexpensive brake pressure control valve is obtained.

What is claimed is:

1. A brake pressure control valve comprising:
 a housing;
 first and second separate fluid passages extending through said housing, said fluid passages having separate first ends connected to a source of hydraulic pressure and separate second ends connected to respective separate brake wheel cylinders of a vehicle;
 first and second valve bodies slidably disposed within said housing, said first and second valve bodies each having first and second opposite ends, said first ends being positioned to face each other, said second ends of said first and second bodies being exposed to said first and second fluid passages, respectively;
 first spring means acting on said first ends for urging said valve bodies away from each other;
 a free piston assembly having opposite first and second end portions slidably received within said first and second valve bodies, respectively, each said end portion having therein a bore;
 means for exposing the end faces of said first and second end portions of said free piston assembly to hydraulic pressure in said first and second fluid passages, respectively;

first and second valve members mounted on and carried by said first and second end portions, respectively, of said free piston assembly for relative sliding movement inwardly and outwardly thereof in opposite directions therefrom, each said valve member comprising an elongated shank extending into the respective said bore of the respective said end portion of said free piston assembly, a first end of said shank having a large diameter portion slidably received in said respective bore, a second end of said shank having a valve head positioned outwardly of said respective bore;

first and second valve seats on said first and second valve bodies, respectively, for engagement with valve heads of said first and second valve members, respectively, to close said first and second fluid passages, respectively;

first and second first stop means positioned to abut said first and second valve members, respectively, for defining a first predetermined spacing between each said valve head and respective said valve seat when the control valve is in the unactuated condition;

first and second second stop means provided in said first and second end portions, respectively, of said free piston assembly for abutting said large diameter portion of each said valve member and for thereby limiting the outward movement of each said valve member from the respective said end portion of said free piston assembly, each said second stop means and said large diameter portion of the respective said valve member being spaced by a second predetermined spacing when the control valve is in the unactuated condition;

each said shank of each said valve member having thereround second spring means acting on the respective said valve head for urging said valve member away from the respective said free end portion of said free piston assembly;

first and second third stop means formed in said first and second valve bodies, respectively, for cooperation with said first and second end faces, respectively, of said free piston assembly and for defining a third predetermined spacing between each said end face and respective said third stop means when the control valve is in the unactuated condition, said third predetermined spacing being greater than said second predetermined spacing;

whereby during normal application of braking pressure, equal hydraulic pressure is supplied through both said first and second fluid passages, thereby operating equally on both said first and second valve bodies and on both said first and second end portions of said free piston assembly; and whereby when failure occurs in said first fluid passage, said hydraulic pressure in said second fluid passage acts against said second end portion of said free piston assembly and causes said free piston assembly to move toward said first valve body until said first end portion of said free piston assembly abuts said first third stop means, and thereby increasing said first predetermined spacing between said second first stop means and said valve head of said second valve member.

2. A brake pressure control valve as claimed in claim 1, wherein, upon said failure in said first fluid passage, said first predetermined spacing between said second first stop means and said second valve head is increased by an amount equal to $l'-l$, wherein $l'$ is the distance moved by said free piston assembly to abut said first third stop means, and $l$ is said second predetermined spacing between said second second stop means and said large diameter portion of said second valve member.

3. A brake pressure control valve as claimed in claim 1 wherein said free piston assembly comprises a single integral piston member having first and second opposite ends slidably and sealingly fitted in respective bores formed in said first and second valve bodies.

4. A brake pressure control valve as claimed in claim 1, wherein said piston assembly comprises first and second separate free pistons slidably and sealingly supported in respective bores formed in said first and second valve bodies, and adjacent ends of said first and second pistons abutting each other.

* * * * *